US012592262B2

(12) United States Patent
Wu

(10) Patent No.: US 12,592,262 B2
(45) Date of Patent: Mar. 31, 2026

(54) METHOD, APPARATUS, READABLE MEDIUM AND ELECTRONIC DEVICE FOR VIDEO PREVIEW

(71) Applicant: Beijing Youzhuju Network Technology Co., Ltd., Beijing (CN)

(72) Inventor: Yuqing Wu, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/729,494

(22) PCT Filed: Mar. 31, 2023

(86) PCT No.: PCT/CN2023/085766
§ 371 (c)(1),
(2) Date: Jul. 16, 2024

(87) PCT Pub. No.: WO2023/202360
PCT Pub. Date: Oct. 26, 2023

(65) Prior Publication Data
US 2025/0095689 A1     Mar. 20, 2025

(30) Foreign Application Priority Data
Apr. 18, 2022     (CN) .......................... 202210405554.4

(51) Int. Cl.
G11B 27/031     (2006.01)
G06F 3/0482     (2013.01)
(Continued)

(52) U.S. Cl.
CPC .......... G11B 27/031 (2013.01); G06F 3/0482 (2013.01); G06F 3/04847 (2013.01); G06F 3/165 (2013.01)

(58) Field of Classification Search
CPC . G11B 27/031; G06F 3/0482; G06F 3/04847; G06F 3/165
See application file for complete search history.

(56) References Cited

U.S. PATENT DOCUMENTS

2008/0247726 A1     10/2008 Lee et al.
2014/0219637 A1*     8/2014 McIntosh ......... G11B 20/00007
386/282
(Continued)

FOREIGN PATENT DOCUMENTS

CN          104322050 A     1/2015
CN          105279161 A     1/2016
(Continued)

OTHER PUBLICATIONS

International Patent Application No. PCT/CN2023/085766; Int'l Search Report; dated Jul. 6, 2023; 2 pages.
(Continued)

*Primary Examiner* — Mishawn N. Hunter
(74) *Attorney, Agent, or Firm* — BakerHostetler

(57)     ABSTRACT

The disclosure relates to a method, an apparatus, a readable medium and an electronic device for video preview. The method for video preview includes: in response to receiving a video editing instruction for a video to be edited, generating and displaying a first target interface, the first target interface including a template display region and a preview region, the template display region including control buttons of a plurality of video templates, and the preview region including a first preview video corresponding to a first target video template in the plurality of video templates; in response to obtaining triggering by a user for a control button of the control buttons corresponding to a second target video template in the plurality of video templates, generating a second preview video corresponding to the
(Continued)

second target video template; and presenting the first preview video and the second preview video in the preview region.

20 Claims, 4 Drawing Sheets

(51) Int. Cl.
G06F 3/04847 (2022.01)
G06F 3/16 (2006.01)

(56) References Cited

U.S. PATENT DOCUMENTS

| | | | |
|---|---|---|---|
| 2015/0371677 A1 | 12/2015 | White | |
| 2017/0365036 A1 | 12/2017 | Wang et al. | |
| 2018/0060690 A1 | 3/2018 | Lee et al. | |
| 2019/0116273 A1 | 4/2019 | Takeuchi | |
| 2021/0321046 A1 | 10/2021 | Zhao et al. | |
| 2022/0044026 A1 | 2/2022 | Huang | |
| 2023/0308752 A1 | 9/2023 | Lu | |
| 2024/0144976 A1 | 5/2024 | Lin | |

FOREIGN PATENT DOCUMENTS

| | | | |
|---|---|---|---|
| CN | 105323456 A | 2/2016 | |
| CN | 105357451 A | 2/2016 | |
| CN | 106201242 A | 12/2016 | |
| CN | 106803991 A | 6/2017 | |
| CN | 107864335 A | 3/2018 | |
| CN | 109089043 A | 12/2018 | |
| CN | 110536177 A | 12/2019 | |
| CN | 111182196 A | 5/2020 | |
| CN | 112165576 A | 1/2021 | |
| CN | 112422846 A | 2/2021 | |
| CN | 112738623 A | 4/2021 | |
| CN | 113115099 A | 7/2021 | |
| CN | 113206948 A | 8/2021 | |
| CN | 113325979 A | 8/2021 | |
| CN | 113747240 A | 12/2021 | |
| CN | 113784165 A | 12/2021 | |
| CN | 115022696 A | 9/2022 | |
| JP | 2015-519625 A | 7/2015 | |
| JP | 2019-075796 A | 5/2019 | |
| JP | 2021-516911 A | 7/2021 | |
| WO | WO 2019/227283 A1 | 12/2019 | |

OTHER PUBLICATIONS

China Patent Application No. 202210405554.4; Office Action; dated May 10, 2023; 21 pages.

China Patent Application No. 202210405554.4; Notification to Grant; dated Nov. 29, 2023; 6 pages.

European Patent Application No. 23791016.1; Extended European Search Report dated Feb. 24, 2025, 10 pages.

Japanese Patent Application No. 2024-542166; Office Action dated Jul. 15, 2025, 14 pages with machine translation.

* cited by examiner

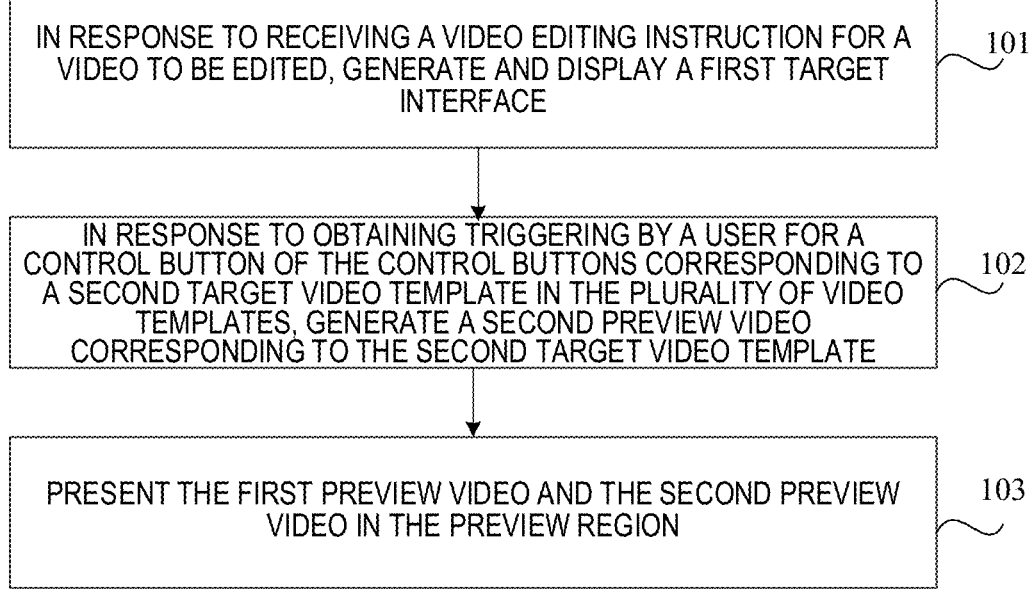

IN RESPONSE TO RECEIVING A VIDEO EDITING INSTRUCTION FOR A VIDEO TO BE EDITED, GENERATE AND DISPLAY A FIRST TARGET INTERFACE — 101

IN RESPONSE TO OBTAINING TRIGGERING BY A USER FOR A CONTROL BUTTON OF THE CONTROL BUTTONS CORRESPONDING TO A SECOND TARGET VIDEO TEMPLATE IN THE PLURALITY OF VIDEO TEMPLATES, GENERATE A SECOND PREVIEW VIDEO CORRESPONDING TO THE SECOND TARGET VIDEO TEMPLATE — 102

PRESENT THE FIRST PREVIEW VIDEO AND THE SECOND PREVIEW VIDEO IN THE PREVIEW REGION — 103

FIG. 1

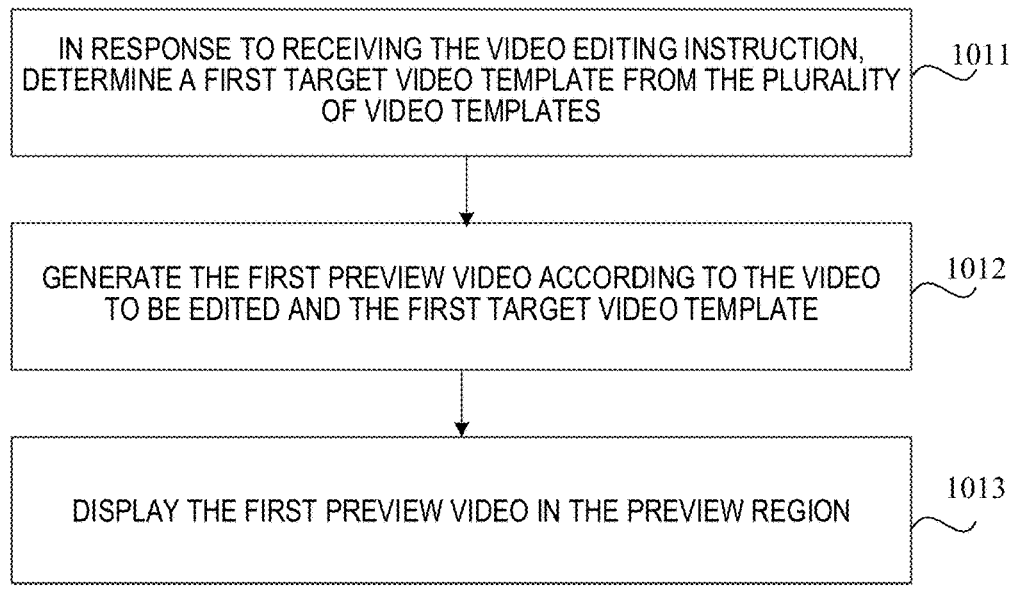

IN RESPONSE TO RECEIVING THE VIDEO EDITING INSTRUCTION, DETERMINE A FIRST TARGET VIDEO TEMPLATE FROM THE PLURALITY OF VIDEO TEMPLATES — 1011

GENERATE THE FIRST PREVIEW VIDEO ACCORDING TO THE VIDEO TO BE EDITED AND THE FIRST TARGET VIDEO TEMPLATE — 1012

DISPLAY THE FIRST PREVIEW VIDEO IN THE PREVIEW REGION — 1013

FIG. 3

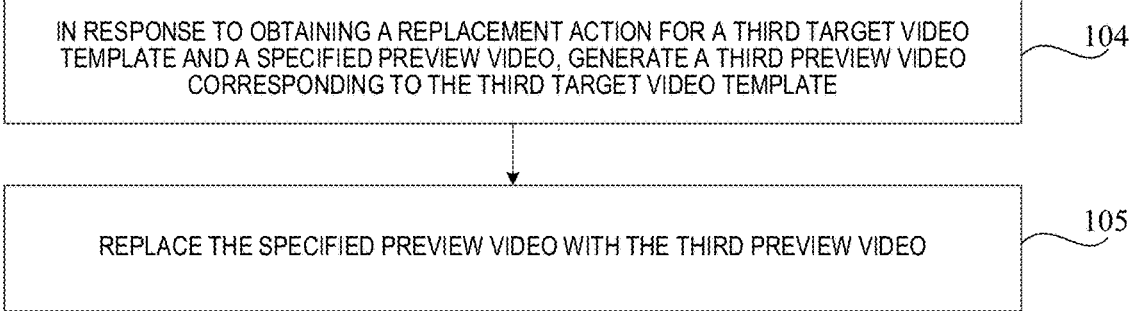

IN RESPONSE TO OBTAINING A REPLACEMENT ACTION FOR A THIRD TARGET VIDEO TEMPLATE AND A SPECIFIED PREVIEW VIDEO, GENERATE A THIRD PREVIEW VIDEO CORRESPONDING TO THE THIRD TARGET VIDEO TEMPLATE — 104

REPLACE THE SPECIFIED PREVIEW VIDEO WITH THE THIRD PREVIEW VIDEO — 105

FIG. 4

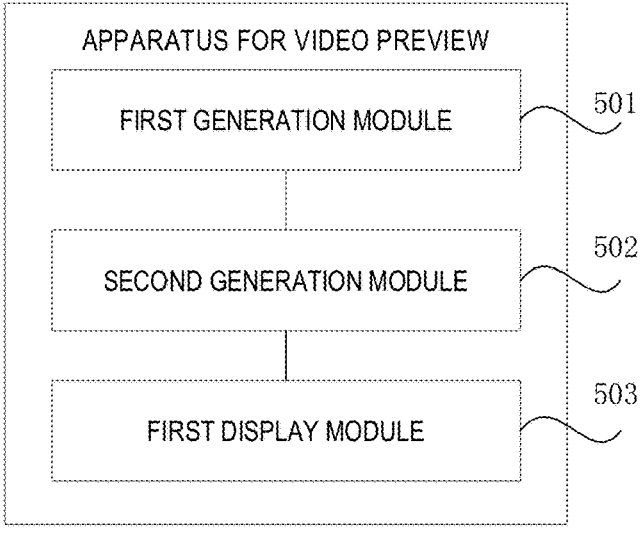

APPARATUS FOR VIDEO PREVIEW

FIRST GENERATION MODULE — 501

SECOND GENERATION MODULE — 502

FIRST DISPLAY MODULE — 503

METHOD, APPARATUS, READABLE MEDIUM AND ELECTRONIC DEVICE FOR VIDEO PREVIEW

CROSS-REFERENCE TO RELATED APPLICATION

This application is the U.S. National Stage of International Application No. PCT/CN2023/085766, filed on Mar. 31, 2023, which claims priority to Chinese patent application No. 202210405554.4, filed on Apr. 18, 2022, and entitled "METHOD, APPARATUS, READABLE MEDIUM AND ELECTRONIC DEVICE FOR VIDEO PREVIEW", which are herein incorporated by reference in their entireties.

FIELD

The present disclosure relates to the field of computer technologies, and in particular to a method, an apparatus, a readable medium and an electronic device for video preview.

BACKGROUND

With the rapid development of self-media and short videos, people have increasing demands for video editing, and nearly every young person has such a demand. Among numerous video editing means, rapid processing of a video to be edited by a video template is favored by a large number of video handlers.

Currently, when the video to be edited is processed by the video template, since the number of video templates is large, it generally takes a long time for a user to select a desired video template, which is unfavorable to improve the video synthesis efficiency, and is also unfavorable to improve the user experience.

SUMMARY

The Summary is provided to introduce the concepts in a simplified form and these concepts are further described in detail in the Detailed Description below. The Summary is not intended to identify key features or essential features of claimed technical solutions, nor is it intended to be used to limit a scope of the claimed technical solutions.

The present disclosure provides a method and an apparatus for video preview, a readable medium and an electronic device.

According to a first aspect, the present disclosure provides a method for video preview. The method includes:

in response to receiving a video editing instruction for a video to be edited, generating and displaying a first target interface, the first target interface including a template display region and a preview region, the template display region including control buttons of a plurality of video templates, and the preview region including a first preview video corresponding to a first target video template in the plurality of video templates;

in response to obtaining triggering by a user for a control button of the control buttons corresponding to a second target video template in the plurality of video templates, generating a second preview video corresponding to the second target video template; and presenting the first preview video and the second preview video in the preview region.

According to a second aspect, the present disclosure provides an apparatus for video preview. The apparatus includes:

a first generation module configured to in response to receiving a video editing instruction for a video to be edited, generate and display a first target interface, the first target interface including a template display region and a preview region, the template display region including control buttons of a plurality of video templates, the preview region including a first preview video corresponding to a first target video template in the plurality of video templates;

a second generation module configured to in response to obtaining triggering by a user for a control button of the control buttons corresponding to the second target video template in a plurality of video templates, generate a second preview video corresponding to the second target video template; and a first display module configured to present the first preview video and the second preview video in the preview region.

According to a third aspect, the present disclosure provides a computer readable medium, having a computer program stored thereon. The computer program, when executed by a processing device, implements the steps of the method according to the above first aspect.

According to a fourth aspect, the present disclosure provides an electronic device, including:

a storage device having a computer program stored thereon; and a processing device configured to execute the computer program in the storage device to implement the steps of the method according to the above first aspect.

According to a fifth aspect, the present disclosure provides a computer program product, including a computer program. The computer program, when executed by a processing device, implements the steps of the method according to the above first aspect.

According to a sixth aspect, the present disclosure provides a computer program. The computer program, when executed by a processing device, implements the steps of the method according to the above first aspect.

Additional features and advantages of the present disclosure will be set forth in the following Detailed Description.

BRIEF DESCRIPTION OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar numerals indicate the same or similar elements. It should be understood that the accompanying drawings are schematic and that the parts and elements are not necessarily drawn to scale. In the drawings:

FIG. 1 is a flowchart of a method for video preview according to an exemplary embodiment of the present disclosure;

FIG. 3 is a flowchart of a method for video preview according to the embodiment shown in FIG. 1 of the present disclosure;

FIG. 4 is a flowchart of another method for video preview according to the embodiment shown in FIG. 1 of the present disclosure;

FIG. 5 is a block diagram of an apparatus for video preview according to an exemplary embodiment of the present disclosure;

DETAILED DESCRIPTION

Figure 2:
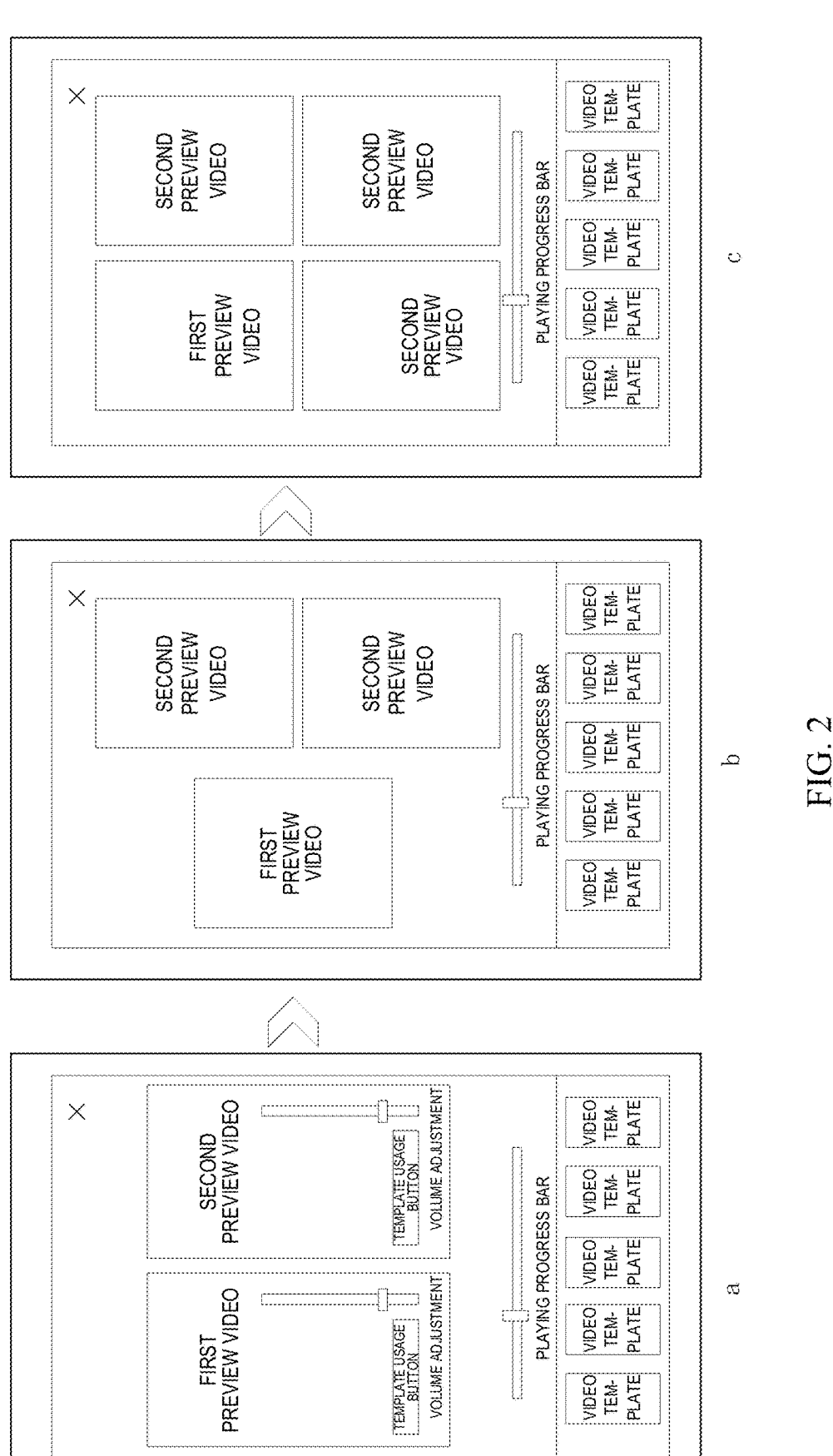
FIG. 2 is a schematic diagram of a preview interface according to an exemplary embodiment of the present disclosure.

The embodiments of the present disclosure will be described below with reference to the drawings. Although the drawings illustrate some embodiments of the present disclosure, it should be understood that the present disclosure may be implemented in various forms and should not be construed as being limited to the embodiments set forth herein, but rather these embodiments are provided for a thorough and complete understanding of the present disclosure. It should be understood that the drawings and the embodiments of the present disclosure are only used for illustrative purposes and are not intended to limit the protection scope of the present disclosure.

It should be understood that the steps described in the method embodiments of the present disclosure may be executed in different sequences and/or in parallel. In addition, the method embodiments may include additional steps and/or omit the execution of the shown steps. The scope of the present disclosure is not limited in this regard.

As used herein, term "include" and its variants should be open-ended, i.e., "including but not limited to". Term "based on" means "based at least in part on". Term "one embodiment" means "at least one embodiment"; term "another embodiment" means "at least one additional embodiment"; and term "some embodiments" means "at least some embodiments". Relevant definitions of other terms will be provided in the following text.

It needs to be noted that concepts such as "first", "second", and the like mentioned in the present disclosure are only used to distinguish different devices, modules or units, and are not used to limit the order of functions performed by these devices, modules or units, or interdependence relationship.

It should be noted that terms "one" and "more" mentioned in the present disclosure are illustrative and not restrictive, and one skilled in the art should understood that this term should be understood as "one or more" unless the context clearly indicates otherwise.

The names of massages or information exchanged among multiple devices in the embodiments of the present disclosure are only for illustrative purpose, and are not used to limit the range of these messages or the information.

It should be understood that before the technical solutions disclosed in the embodiments of the present disclosure are used, a user should be informed of the type, the usage range, the usage scenario, and the like of personal information related to the present disclosure in an appropriate manner and the authorization of the user should be obtained according to relevant legal regulations.

For example, in response to receiving an active request from the user, prompt information is sent to the user to explicitly prompt the user that an operation requested by the user will require acquisition and use of the personal information of the user. Thus, the user can autonomously select, according to the prompt information, whether to provide the personal information to software or hardware such as an electronic device, an application program, a server, or a storage medium that executes operations of the technical solutions of the present disclosure.

As an optional but non-limiting implementation, in response to receiving the active request of the user, the manner of sending the prompt information to the user may be, for example, in the form of a pop-up window, where the pop-up window may present the prompt information therein in a text manner. In addition, the pop-up window may also carry a selection control for the user to select "agree" or "disagree" therein to provide the personal information to the electronic device.

It can be understood that the above notification and acquisition of the user authorization process is merely exemplary, and does not pose limitations to the implementation of the present disclosure, and other manners meeting relevant legal regulations may also be applied to the implementation of the present disclosure.

At the same time, it should be understood that the data involved in the technical solutions (including but not limited to the data itself, and the acquisition or use of the data) should comply with the requirements of the corresponding legal regulations and related provisions.

Before describing the specific embodiments of the present disclosure, the following describes an application scenario of the present disclosure first. The present disclosure may be applied in a video editing process, and in particular, in a scenario where a video is edited through a video template. In the current editing process through the video template, generally, only the effect video corresponding to one video template can be previewed. However, since a visual difference between different video templates is not necessarily large, it is possible that only a few frames have distinct features. When selecting the template, the user generally needs to preview the video templates one by one, which is time-consuming. Moreover, the user can preview only one video template at a time. Furthermore, since a certain loading time is required after the video template is selected, it is easy for the user to forget the previously previewed video effects. As a result, when there are a large number of video templates, it is inevitable that it takes a long time for the user to select the desired video template, which is not beneficial to improve video synthesis efficiency, and is also not beneficial to improve user experience.

In order to solve the above technical problems, the present disclosure provides a method and an apparatus for video preview, a readable medium, and an electronic device, The method for video preview includes: in response to receiving a video editing instruction for a video to be edited, generating and displaying a first target interface, the first target interface including a template display region and a preview region, the template display region including control buttons of a plurality of video templates, and the preview region including a first preview video corresponding to a first target video template in the plurality of video templates; in response to obtaining triggering by a user for a control button of the control buttons corresponding to a second target video template in the plurality of video templates, generating a second preview video corresponding to the second target video template; and presenting the first preview video and the second preview video in the preview region. In this way, by presenting the first preview video and the second preview video in the preview region, it is convenient for the user to compare the effects of generating the video by using different video templates, thereby improving the speed for the user to select the video template, improving the video synthesis efficiency, and further effectively improving the user experience.

The technical solutions of the present disclosure will be described in detail below in conjunction with specific embodiments.

FIG. 1 is a flowchart of a method for video preview according to an exemplary embodiment of the present disclosure. As shown in FIG. 1, the method may include the following steps:

Step 101: in response to receiving a video editing instruction for a video to be edited, a first target interface is generated and displayed.

The first target interface includes a template display region and a preview region, wherein the template display region includes control buttons of a plurality of video templates, and the preview region includes a first preview video corresponding to a first target video template in the plurality of video templates.

Exemplarily, the video to be edited may be a game video obtained by screen recording. The video editing instruction may be triggered by clicking a screen recording stopping button by the user during game screen recording. The video to be edited may also be a video shot by a camera of a terminal, and may also be a video locally stored in the terminal obtained by other means.

It should be noted that, when the first preview video is generated and displayed on the first target interface, a loading animation with a video template may be matched. With a change in a loading progress of the video template, a preset cartoon figure pulls a mask layer on the video open, and the first preview video is brightened and starts to be played.

Step 102: in response to obtaining triggering of the user for the control button corresponding to a second target video template in the plurality of video templates, a second preview video corresponding to the second target video template is generated.

The second target video template is a video template in the plurality of video templates other than the first video template, and the triggering may be dragging (single-clicking, long-pressing or double-clicking) of the control button corresponding to the second target video template.

Step 103: the first preview video and the second preview video are presented in the preview region.

One possible embodiment of this step is that the preview region may include a first display window and at least one second display window therein. The first display window is used to display the first preview video, and the second display window is used to display the second preview video. In this step, the first display window may be scaled down to a predetermined size, and the scaled-down first display window is moved to a first specified region in the preview region; the first preview video is displayed in the scaled-down first display window; and the second preview video is displayed in the second display window in a second specified region.

The size of the first display window is the same as that of the second display window, and the predetermined size may be obtained in the following manner: obtaining a target number of preview videos displayed in the current preview region; and determining the predetermined size from a predetermined size correspondence based on the target number.

It should be noted that a plurality of the second target video templates may be included, and in the case where only one second target video template is included, only one second preview video is included, as shown by a in FIG. 2 (FIG. 2 is a schematic diagram of a preview interface according to an exemplary embodiment of the present disclosure). The first specified region may be a left side (or upper side) of the preview region, and the second specified region may be a right side (or lower side) of the preview region. In the case where two second target video templates are included, as shown by b in FIG. 2, the first specified region may be located at a left side (or upper side middle) of the preview region, and the second specified region may be a right upper side (or lower left side) or a right lower side (or lower right side). In the case where three second target video templates are included, as shown by c in FIG. 2, the first specified region may be located at a left upper side of the preview region, and the second specified region may be a right upper side, a right lower side, or a left lower side.

In addition, when there are two (three, four, five or six) preview videos displayed in the preview region, the corresponding size of each display window may be set in advance. That is, a size correspondence is generated in advance, and the size correspondence may record the correspondence between the target number and the predetermined size in the form of a list. When the user selects one second target video template (namely, obtaining the triggering for the second target video template), the target number of preview videos in the current preview region may be obtained, and then the predetermined size may be determined according to the target number. For example, three preview videos are displayed currently, including one first preview video and two second preview videos, and then the size corresponding to the three preview videos may be obtained from the size correspondence, so as to obtain the predetermined size. In this way, the size of the display window corresponding to the plurality of preview videos can be flexibly controlled, and the display number of the preview videos is further flexibly adjusted.

In the above technical solution, the first preview video and the second preview video are presented in the preview region, which is convenient for the user to compare the effects of generating the video by using different video templates, thereby improving the speed for the user to select the video template, improving the video synthesis efficiency, and further effectively improving the user experience.

FIG. 3 is a flowchart of a method for video preview according to the embodiment shown in FIG. 1 of the present disclosure. As shown in FIG. 3, in response to receiving the video editing instruction for the video to be edited, generating and displaying the first target interface according to Step 101 in the above FIG. 1 may include the following steps:

Step 1011: in response to receiving the video editing instruction, the first target video template is determined from the plurality of video templates.

In this step, a first playing duration of the video to be edited and a second playing duration of each of the video templates may be obtained; a target difference value between the first playing duration of the video to be edited and the second playing duration of each of the video templates is obtained; and the first target video template is determined according to a specified video template with a minimum target difference value.

In addition, in the process of determining the first target video template according to the specified video template with the minimum target difference value, in the case where it is determined that there are a plurality of specified video templates, a historical usage amount of each of the specified video templates is obtained; and the specified video template with a maximum historical usage amount is used as the first target video template.

Exemplarily, the first playing duration of the video to be edited is 13 s (second), the second playing duration of a video template A is 15 s, the second playing duration of a video template B is 15.3 s, the second playing duration of a video template C is 13.1 s, the second playing duration of a video template D is 13.5 s, the second playing duration of a video template E is 12.9 s, and the second playing duration of a video template F is 12.6 s. The target difference value between the first playing duration and the second playing duration corresponding to each of the video templates is obtained, and it can be obtained that the corresponding target difference value between the video to be edited and the video template A is 2 s, the corresponding target difference value between the video to be edited and the video template B is 2.3 s, the corresponding target difference value between the video to be edited and the video template C is 0.1 s, the corresponding target difference value between the video to be edited and the video template D is 0.5 s, the corresponding target difference value between the video to be edited and the video template E is 0.1 s, and the corresponding target difference value between the video to be edited and the video template F is 0.5 s. Since 0.1 s is the minimum value among the plurality of target difference values, and the target difference values corresponding to the video template C and the video template E are both 0.1 s, a first historical usage amount corresponding to the video template C and a second historical usage amount corresponding to the video template E can be obtained. In the case where the first historical usage amount is greater than the second historical usage amount, the video template C is used as the first target video template. In the case where the first historical usage amount is less than the second historical usage amount, the video template E is used as the first target video template. In the case where the first historical usage amount is equal to the second historical usage amount, the video template E and the video template C are both used as the first target video template.

Step 1012: the first preview video is generated according to the video to be edited and the first target video template.

In this step, when the first preview video is generated, the first target video template may be loaded, and then the first target video template is applied to the video to be edited, so as to generate the first preview video.

It should be noted that when the first target video template is loaded, a loading animation with the video template may be matched to display a relevant prompt during template loading. With a change in a loading progress of the video template, a preset cartoon figure pulls a mask layer on the video open, and the first preview video is brightened and starts to be played when determining that the first preview video is generated.

Step 1013: the first preview video is displayed in the preview region.

In this step, the preview region may include the first display window, and the first preview video is displayed through the first display window.

In the above technical solution, the first target video template closest to the duration of the video to be edited can be screened out from the plurality of video templates, and when entering the first target interface, the first preview video corresponding to the first target video template is displayed in the first target interface, which is favorable for the user to rapidly screen the video template, can effectively improve template screening efficiency and the video synthesis efficiency, and further effectively improves the user experience.

Optionally, in response to receiving the video editing instruction for the video to be edited, generating and presenting the first target interface according to Step 101 in the above FIG. 1 may further include:

displaying the control buttons of the plurality of video templates in the template display region in an ascending order of the target difference values.

Exemplarily, still taking the example shown in the above Step 1011 as an example, the arrangement sequence corresponding to the control buttons of the plurality of video templates (namely, the video template A to the video template F) in the template display region is: the video template C, the video template E, the video template D, the video template F, the video template A, and the video template B.

In the above technical solution, the control buttons of the plurality of video templates can be displayed in the template display region in an ascending order of the target difference values, which is favorable for the user to rapidly screen the video template, can effectively improve the template screening efficiency and the video synthesis efficiency, and further effectively improves the user experience.

Optionally, the first target interface further includes a playing progress bar of the video to be edited, and the method may further include:

establishing a correlation between the first preview video, the second preview video and the playing progress bar, to cause the playing progress bar to simultaneously control playing progresses of the first preview video and the second preview video.

It should be noted that in the case where a plurality of the second preview videos are included, the correlation between each of the second preview videos and the playing progress bar of the video to be edited may be established, thereby realizing the control of each preview video in the preview region through the playing progress bar of the video to be edited. When each second preview video is added to the preview region, the first preview video and the second preview video are both played from a starting frame. Therefore, it can be effectively guaranteed that the plurality of preview videos are played synchronously, and all the images displayed by the plurality of preview videos presented in the current preview region are the same. In this way, it is beneficial for the user to compare display effects of the plurality of preview videos, thereby effectively improving the efficiency of screening the video template.

In the above technical solution, by establishing the correlation between the first preview video, the second preview video and the playing progress bar of the video to be edited, the playing progresses of the first preview video and the second preview video can be controlled by the playing progress bar of the video to be edited. The video control efficiency can be effectively improved, the efficiency of screening the video template can also be effectively improved, and it is beneficial to improve the user experience.

FIG. 4 is a flowchart of another method for video preview according to the embodiment shown in FIG. 1 of the present disclosure. As shown in FIG. 4, after presenting the first preview video and the second preview video in the preview region according to Step 103 in the above FIG. 1, the method may further include:

Step 104: in response to obtaining a replacement action for a third target video template and a specified preview video, a third preview video corresponding to the third target video template is generated.

The third target video template is a video template in the plurality of video templates other than the first target video template and the second target video template. The replacement action may be dragging of a control button of the third target video template to the top of the specified preview video, or single-clicking of the specified preview video after clicking (single-clicking, double-clicking, or long-pressing) of the third target video template.

Step 105: the specified preview video is replaced with the third preview video.

The specified preview video is the first preview video or the second preview video.

In the above technical solution, preview comparison can be performed on the video templates other than the first target video template and the second target video template by means of replacement in the case where the number of preview videos presented in the preview region is limited, thereby effectively improving the user experience in a video template screening process.

Optionally, the method further includes:

in response to obtaining a position adjustment action for a first preview video to be adjusted and a second preview video to be adjusted, adjusting display regions of the first preview video to be adjusted and the second preview video to be adjusted.

The first preview video to be adjusted may be the first preview video, and may also be the second preview video. The second preview video to be adjusted is another preview video in the preview region other than the first preview video to be adjusted. The position adjustment action may be dragging of the video template corresponding to the first preview video to be adjusted to the top of the video template corresponding to the second preview video to be adjusted, or dragging of the first preview video to be adjusted to the top of the second preview video to be adjusted.

In the above technical solution, display positions of the plurality of preview videos can be effectively adjusted, which is convenient for the user to compare the plurality of preview videos, thereby effectively improving the efficiency of screening the video template.

Optionally, each video template includes a volume adjustment button, and the method further includes:

obtaining a playing volume input by the volume adjustment button corresponding to each preview video in the preview display region, and playing each preview video according to the playing volume corresponding to the preview video.

As shown in FIG. 2, the volume adjustment button may be disposed in a display window where each preview video is located, and the user may control the playing volume of the preview video by the volume adjustment button corresponding to each preview video, so that the playing volumes of different preview videos can be adjusted in a personalized manner, and the user experience in a video template screening process can be effectively improved.

Optionally, as shown in FIG. 2, each video template may further include a template usage button, the template usage button is displayed on a preview video image of the corresponding video template, and the method further includes:

in response to receiving a usage instruction triggered by the template usage button on the target preview video, displaying, in the video preview region, only the target preview video; and in response to receiving a video generating instruction, storing the target preview video.

The user may click the template usage button to trigger the usage instruction. After the terminal obtains the usage instruction, the clicked template may use the preview video corresponding to the button as the target preview video, and displaying of other preview videos other than the target preview video are stopped. The user may trigger the video generating instruction by clicking a preset storing (or sending) button, and the preset storing (or sending) button may be a "×" sign of closing the current interface.

In the above technical solution, the preview video corresponding to an undesired video template can be quickly turned off, and further the desired target preview video of the user can be conveniently and rapidly stored. The video synthesis efficiency can be effectively improved, and the user experience is improved.

FIG. 5 is a block diagram of an apparatus for video preview according to an exemplary embodiment of the present disclosure. As shown in FIG. 5, the apparatus may include:

a first generation module 501 configured to, in response to receiving a video editing instruction for a video to be edited, generate and display a first target interface, the first target interface including a template display region and a preview region, the template display region including control buttons of a plurality of video templates, the preview region including a first preview video corresponding to a first target video template in the plurality of video templates;

a second generation module 502 configured to, in response to obtaining triggering by a user for a control button of the control buttons corresponding to the second target video template in a plurality of video templates, generate a second preview video corresponding to the second target video template; and a first display module 503 configured to present the first preview video and the second preview video in the preview region.

In the above technical solution, the first preview video and the second preview video are presented in the preview region, which is convenient for the user to compare the effects of generating the video by using different video templates, thereby improving the speed for the user to select the video template, improving the video synthesis efficiency, and further effectively improving the user experience.

Optionally, the first generation module 501 is configured to:

in response to receiving the video editing instruction, determine the first target video template from the plurality of video templates;

generate the first preview video according to the video to be edited and the first target video template; and present the first preview video in the preview region.

Optionally, the first generation module 501 is configured to:

obtain a first playing duration of the video to be edited and a second playing duration of each of the video templates;

obtain a target difference value between the first playing duration of the video to be edited and the second playing duration of each of the video templates; and determine the first target video template according to a specified video template with a minimum target difference value.

Optionally, the first generation module 501 is configured to:

in the case where it is determined that there are a plurality of specified video templates, obtain a historical usage amount of each of the specified video templates; and use the specified video template with a maximum historical usage amount as the first target video template.

Optionally, the first generation module 501 is configured to:

display the control buttons of the plurality of video templates in the template display region in an ascending order of the target difference values.

Optionally, the preview region includes a first display window and a second display window, the first display window is used to display the first preview video, and the second display window is used to display the second preview video. The first display module 503 is configured to:

scale-down the first display window to a predetermined size, and move the scaled-down first display window to a first specified region in the preview region;

display the first preview video through the scaled-down first display window; and display the second preview video within the second display window in a second specified region.

Optionally, the first display module 503 is further configured to:

obtain a target number of preview videos displayed in the current preview region; and determine the predetermined size from a predetermined size correspondence according to the target number.

After the second display window is adjusted to the predetermined size, the first preview video and the second preview video are controlled to start to be played from a starting frame.

In the above technical solution, the size of the display window corresponding to a plurality of preview videos can be flexibly controlled, thereby flexibly adjusting the display number of the preview videos, improving the speed for the user to select the video template, improving the video synthesis efficiency, and further effectively improving the user experience.

Figure 6:
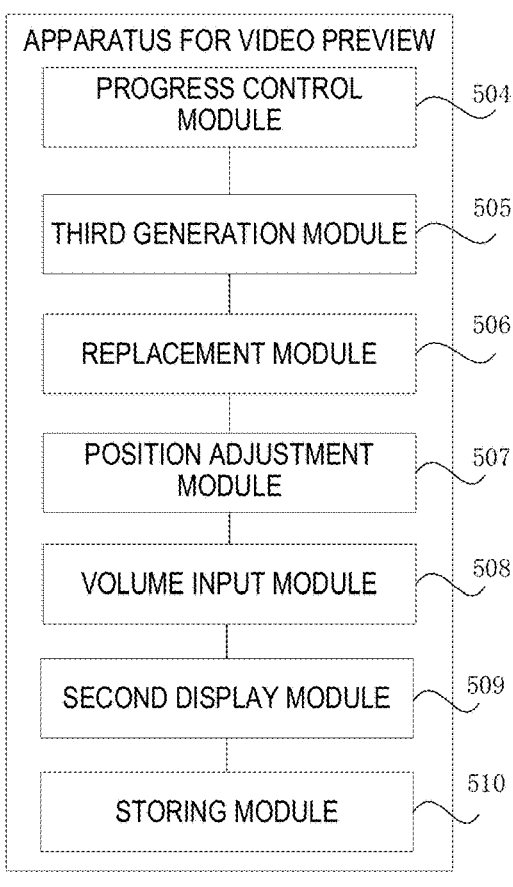
FIG. 6 is a block diagram of an apparatus for video preview according to the embodiment shown in FIG. 5 of the present disclosure.

Optionally, FIG. 6 is a block diagram of an apparatus for video preview according to the embodiment shown in FIG. 5 of the present disclosure. As shown in FIG. 6, the first target interface further includes a playing progress bar of the video to be edited, and the apparatus may further include:

a progress control module 504 configured to establish a correlation between the first preview video, the second preview video and the playing progress bar, to cause the playing progress bar to simultaneously control playing progresses of the first preview video and the second preview video.

Optionally, the apparatus further includes:

a third generation module 505 configured to, in response to obtaining a replacement action for a third target video template and a specified preview video, generate a third preview video corresponding to the third target video template; and a replacement module 506 configured to replace the specified preview video with the third preview video, wherein the specified preview video is the first preview video or the second preview video.

In the above technical solution, by establishing the correlation between the first preview video, the second preview video and the playing progress bar of the video to be edited, the playing progresses of the first preview video and the second preview video can be controlled by the playing progress bar of the video to be edited. The video control efficiency can be effectively improved, the efficiency of screening the video template can also be effectively improved, and it is beneficial to improve the user experience.

Optionally, the apparatus further includes:

a position adjustment module 507 configured to, in response to obtaining a position adjustment action for a first preview video to be adjusted and a second preview video to be adjusted, adjust display regions of the first preview video to be adjusted and the second preview video to be adjusted.

In the above technical solution, display positions of the plurality of preview videos can be effectively adjusted, which is convenient for the user to compare the plurality of preview videos, thereby effectively improving the efficiency of screening the video template.

Optionally, each video template includes a volume adjustment button. The apparatus further includes:

a volume input module 508 configured to obtain a playing volume input by the volume adjustment button corresponding to each preview video in the preview display region, and play each preview video according to the playing volume corresponding to the preview video.

Optionally, each video template further includes a template usage button, and the template usage button is displayed on a preview video image of the corresponding video template. The apparatus further includes:

a second display module 509 configured to, in response to receiving a usage instruction triggered by the template usage button on the target preview video, display, in the video preview region, only the target preview video; and a storing module 510 configured to, in response to receiving a video generating instruction, store the target preview video.

In the above technical solution, the preview video corresponding to an undesired video template can be quickly turned off, and further the desired target preview video of the user can be conveniently and rapidly stored. The video synthesis efficiency can be effectively improved, and the user experience is improved.

Figure 7:
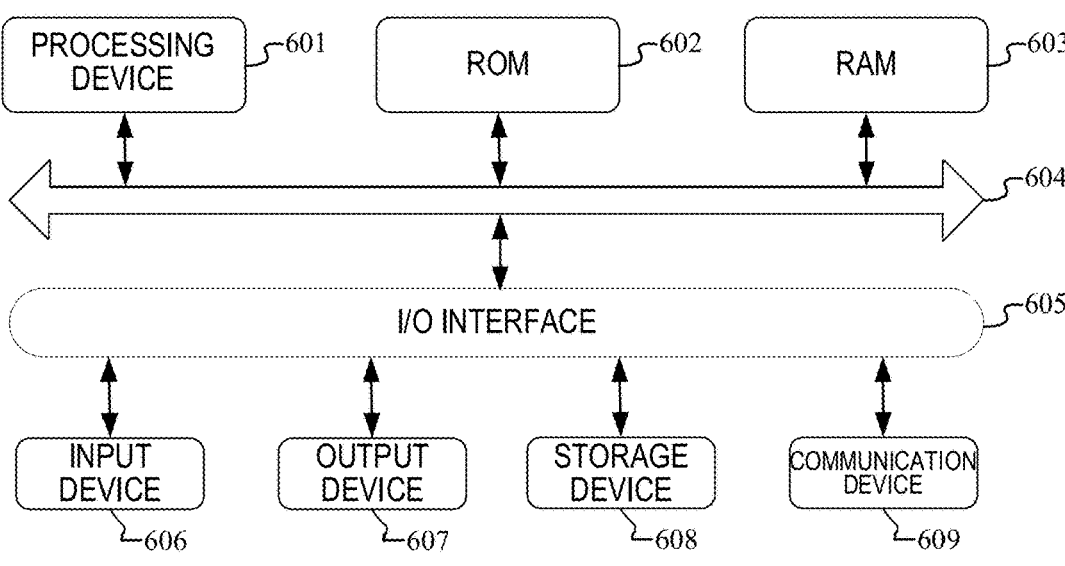
FIG. 7 is a block diagram of an electronic device according to an exemplary embodiment of the present disclosure.

Next, reference is made to FIG. 7, which shows a schematic structural diagram of an electronic device 600 adapted to implement the embodiments of the present disclosure. The terminal device in the embodiments of the present disclosure may include but is not limited to a mobile terminal, such as a mobile phone, a notebook computer, a digital broadcast receiver, a Personal Digital Assistant (PDA), a Portable Android Device (PAD), a Portable Media Player (PMP), and an onboard terminal (such as an onboard navigation terminal), and a fixed terminal, such as a digital TV and a desktop computer. The electronic device shown in FIG. 7 is only an example, and should not limit the functions and use range of the embodiments of the present disclosure in any way.

As shown in FIG. 7, the electronic device 600 may include a processing device (such as a central processing unit, a graphics processing unit, or the like) 601 that may perform various appropriate actions and processing according to a program stored in a Read-Only Memory (ROM) 602 or a program loaded from a storage apparatus 608 into a Random Access Memory (RAM) 603. In the RAM 603, various programs and data required for operation of the electronic device 600 are further stored. The processing device 601, the ROM 602, and the RAM 603 are connected to each other by a bus 604. An input/output (I/O) interface 605 is also connected to the bus 604.

Generally, the following apparatuses may be connected to the I/O interface 605: input device 606 including, for example, a touchscreen, a touchpad, a keyboard, a mouse, a camera, a microphone, an accelerometer, and a gyroscope; output device 607 including, for example, a Liquid Crystal Display (LCD), a loudspeaker and a vibrator; storage device 608 including, for example, a tape or a hard disk; and a communication device 609. The communication device 609 may allow the electronic device to communicate wirelessly or wiredly with another device to exchange data. Although FIG. 7 shows the electronic device 600 with various apparatuses, it should be understood that it is not required to implement or provide all shown apparatuses. Alternatively, more or fewer apparatuses may be implemented or provided.

In particular, according to the embodiments of the present disclosure, the process described above with reference to the flowchart may be implemented as a computer software program. For example, an embodiment of the present disclosure includes a computer program product that includes a computer program carried on a non-transitory computer-readable medium, and the computer program includes program codes used to perform the methods shown in the flowchart. In such an embodiment, the computer program may be downloaded and installed from a network by the communication device 609, installed from the storage apparatus 608, or installed from the ROM 602. When the computer program is executed by the processing device 601, the foregoing functions defined in the method in the embodiments of the present disclosure are executed.

It should be noted that the foregoing computer-readable medium in the present disclosure may be a computer-readable signal medium, a computer-readable storage medium, or any combination of the two. The computer-readable storage medium may be, for example, an electrical, magnetic, optical, electromagnetic, infrared, or semiconductor system, apparatus, or device, or any combination thereof. More specific examples of the computer-readable storage medium may include but are not limited to: an electrical connection having one or more conducting wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that includes or stores a program, and the program may be used by or in combination with an instruction execution system, apparatus, or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may further be any computer-readable medium other than the computer-readable storage medium, and the computer-readable signal medium may send, propagate, or transmit a program that is used by or in combination with an instruction execution system, apparatus, or device. The program code included in the computer-readable medium may be transmitted by using any suitable medium, including but not limited to: a wire, an optical cable, a radio frequency (RF), or any suitable combination thereof.

In some embodiments, communication may be carried out by using any currently known or future-developed network protocol, for example, a Hyper Text Transfer Protocol (HTTP), and interconnection with the digital data communication (for example, a communication network) of any form or any medium may be realized. Examples of the communication network include a Local Area Network (LAN), a Wide Area Network (WAN), an internet network (for example, the Internet), and an end-to-end network (for example, an ad hoc end-to-end network), and any currently known or future-developed network.

The foregoing computer readable medium may be included in the foregoing electronic device, or may exist separately and not be assembled into the electronic device.

The foregoing computer readable medium stores one or more programs. When the one or more programs is/are executed by the electronic device, the electronic device is caused to: in response to receiving a video editing instruction for a video to be edited, generate and display a first target interface, the first target interface including a template display region and a preview region, the template display region including control buttons of a plurality of video templates, the preview region including a first preview video corresponding to a first target video template in the plurality of video templates; in response to obtaining triggering by a user for a control button of the control buttons corresponding to the second target video template in a plurality of video templates, generate a second preview video corresponding to the second target video template; and present the first preview video and the second preview video in the preview region.

Computer program codes for performing the operations of the present disclosure may be written in one or more programming languages or a combination thereof, including but not limited to object-oriented programming languages such as Java, Smalltalk, C++, and conventional procedural programming languages such as "C" or similar program design languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a Local Area Network (LAN) or a Wide Area Network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The modules described in embodiments of the present disclosure may be implemented either by means of software or by means of hardware. The names of these modules do not limit the modules themselves under certain circumstances. For example, the first generation module may also be described as "a first generation module configured to, in response to receiving a video editing instruction for a video to be edited, generate and display a first target interface, the first target interface including a template display region and a preview region, the template display region including control buttons of a plurality of video templates, and the preview region including a first preview video corresponding to a first target video template in the plurality of video templates".

Various functions described herein above can be implemented by one or more hardware logic members. For example and without limitations thereto, an exemplary hardware logic component includes a Field Programmable Gate Array (FPGA), an Application Specific Integrated Circuit (ASIC), an Application Specific Standard Product (ASSP), a System on Chip (SOC), a Complex Programmable Logic Device (CPLD) or the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses or devices, or any suitable combination of the foregoing. More specific examples of machine-readable storage media would include one or more wire-based electrical connections, portable computer disks, hard disks, random-access memories (RAMs), read-only memories (ROMs), erasable programmable read-only memories (EPROM or flash memories), fiber optics, portable compact disk read only memories (CD-ROMs), optical storage devices, magnetic storage devices, or any suitable combination of the foregoing.

According to one or more embodiments of the present disclosure, Example 1 provides a method for video preview. The method includes:

in response to receiving a video editing instruction for a video to be edited, generating and displaying a first target interface, the first target interface including a template display region and a preview region, the template display region including control buttons of a plurality of video templates, and the preview region including a first preview video corresponding to a first target video template in the plurality of video templates;

in response to obtaining triggering by a user for a control button of the control buttons corresponding to a second target video template in the plurality of video templates, generating a second preview video corresponding to the second target video template; and presenting the first preview video and the second preview video in the preview region.

According to one or more embodiments of the present disclosure, Example 2 provides the method of Example 1, wherein in response to receiving the video editing instruction for the video to be edited, generating and displaying the first target interface includes:

in response to receiving the video editing instruction, determining a first target video template from the plurality of video templates;

generating the first preview video according to the video to be edited and the first target video template; and displaying the first preview video in the preview region.

According to one or more embodiments of the present disclosure, Example 3 provides the method of Example 2, wherein determining the first target video template from the plurality of video templates includes:

obtaining a first playing duration of the video to be edited and a second playing duration of each of the video templates;

obtaining a target difference value between the first playing duration of the video to be edited and the second playing duration of each of the video templates; and determining the first target video template according to a specified video template of the video templates with a minimum target difference value.

According to one or more embodiments of the present disclosure, Example 4 provides the method of Example 3, wherein determining the first target video template according to the specified video template of the video templates with the minimum target difference value includes:

in the case of determining that there are a plurality of the specified video templates, obtaining a historical usage amount of each of the specified video templates; and using a specified video template of the specified video templates with a maximum historical usage amount as the first target video template.

According to one or more embodiments of the present disclosure, Example 5 provides the method of Example 3, wherein in response to receiving the video editing instruction for the video to be edited, generating and displaying the first target interface further includes:

displaying the control buttons of the plurality of video templates in the template display region in an ascending order of the target difference values.

According to one or more embodiments of the present disclosure, Example 6 provides the method of Example 1, wherein the preview region includes a first display window and a second display window, the first display window is used to display the first preview video, and the second display window is used to display the second preview video, and wherein presenting the first preview video and the second preview video in the preview region includes:

scaling-down the first display window to a predetermined size, and moving the scaled-down first display window to a first specified region in the preview region;

displaying the first preview video through the scaled-down first display window; and displaying the second preview video within the second display window in a second specified region.

According to one or more embodiments of the present disclosure, Example 7 provides the method of Example 6, wherein before scaling-down the first display window to the predetermined size, displaying the first preview video and the second preview video in the preview region further includes:

obtaining a target number of preview videos displayed in the current preview region; and determining the predetermined size from a predetermined size correspondence according to the target number.

According to one or more embodiments of the present disclosure, Example 8 provides the method of Example 6, wherein displaying the second preview video within the second display window in the second specified region includes:

after adjusting the second display window to the predetermined size, controlling the first preview video and the second preview video to play from a starting frame.

According to one or more embodiments of the present disclosure, Example 9 provides the method according to any of Examples 1 to 8, wherein the first target interface further includes a playing progress bar of the video to be edited, and the method further includes:

establishing a correspondence between the first preview video, the second preview video and the playing progress bar, to cause the playing progress bar to simultaneously control playing progresses of the first preview video and the second preview video.

According to one or more embodiments of the present disclosure, Example 10 provides the method according to any of Examples 1 to 8, wherein the method further includes:

in response to obtaining a replacement action for a third target video template and a specified preview video, generating a third preview video corresponding to the third target video template; and replacing the specified preview video with the third preview video, wherein the specified preview video is the first preview video or the second preview video.

According to one or more embodiments of the present disclosure, Example 11 provides the method according to any of Examples 1 to 8, wherein the method further includes:

in response to obtaining a position adjustment action for a first preview video to be adjusted and a second preview video to be adjusted, adjusting display regions of the first preview video to be adjusted and the second preview video to be adjusted.

According to one or more embodiments of the present disclosure, Example 12 provides the method according to any of Examples 1 to 8, wherein each video template includes a volume adjustment button, and the method further includes:

obtaining a playing volume input via the volume adjustment button corresponding to each preview video in the preview display region, and playing the preview video according to the playing volume corresponding to each preview video.

According to one or more embodiments of the present disclosure, Example 13 provides the method according to any of Examples 1 to 8, wherein each of the video templates further includes a template usage button, the template usage button is displayed on a preview video image of a corresponding video template, and the method further includes:

in response to receiving a usage instruction triggered by the template usage button on the target preview video, displaying, in the video preview region, only the target preview video; and in response to receiving a video generating instruction, storing the target preview video.

According to one or more embodiments of the present disclosure, Example 14 provides an apparatus for video preview. The apparatus includes:

a first generation module configured to, in response to receiving a video editing instruction for a video to be edited, generate and display a first target interface, the first target interface including a template display region and a preview region, the template display region including control buttons of a plurality of video templates, the preview region including a first preview video corresponding to a first target video template in the plurality of video templates;

a second generation module configured to, in response to obtaining triggering by a user for a control button of the control buttons corresponding to the second target video template in a plurality of video templates, generate a second preview video corresponding to the second target video template;

a first display module configured to present the first preview video and the second preview video in the preview region.

According to one or more embodiments of the present disclosure, Example 15 provides a computer readable medium having a computer program stored thereon. The computer program, when executed by a processing device, implements the steps of the method according to any of the above Examples 1 to 13.

According to one or more embodiments of the present disclosure, Example 16 provides an electronic device, including:

a storage device having a computer program stored thereon; and a processing device configured to execute the computer program in the storage device to implement the steps of the method according to any of the above Examples 1 to 13.

According to one or more embodiments of the present disclosure, Example 17 provides a computer program product, including a computer program. The computer program, when executed by a processing device, implements the steps of the method according to any of the above Examples 1 to 13.

According to one or more embodiments of the present disclosure, Example 18 provides a computer program. The computer program, when executed by a processing device, implements the steps of the method according to any of the above Examples 1 to 13.

The above description is only preferred embodiments of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logical actions, it should be understood that the subject matter limited in the appended claims is not necessarily limited to the particular features or actions described above.

Rather, the particular features and actions described above are merely example forms of implementing the claims. With regard to the apparatus in the above embodiments, the specific manner in which each module performs operations has been described in detail in the method embodiments of the method, and will not be described in detail here.

What is claimed is:

1. A method of video preview, comprising:

in response to receiving a video editing instruction for a video to be edited, generating and displaying a first target interface, the first target interface including a template displaying region and a preview region, the template displaying region including control buttons of a plurality of video templates, and the preview region including a first preview video corresponding to a first target video template in the plurality of video templates;

in response to obtaining triggering by a user for a control button of the control buttons corresponding to a second target video template in the plurality of video templates, generating a second preview video corresponding to the second target video template; and presenting the first preview video and the second preview video in the preview region, wherein the first target interface further includes a playing progress bar of the video to be edited, and the method further comprises:

establishing a correlation between the first preview video, the second preview video, and the playing progress bar to cause the playing progress bar to simultaneously control playing progress of the first preview video and the second preview video.

2. The method of claim 1, wherein in response to receiving the video editing instruction for the video to be edited, generating and displaying the first target interface comprises:

in response to receiving the video editing instruction, determining a first target video template from the plurality of video templates;

generating the first preview video according to the video to be edited and the first target video template; and displaying the first preview video in the preview region.

3. The method of claim 2, wherein determining the first target video template from the plurality of video templates comprises:

obtaining a first playing duration of the video to be edited and a second playing duration of each of the video templates;

obtaining a target difference value between the first playing duration of the video to be edited and the second playing duration of each of the video templates; and determining the first target video template according to a specified video template of the video templates with a minimum target difference value.

4. The method of claim 3, wherein determining the first target video template according to the specified video template of the video templates with the minimum target difference value comprises:

in response to determining that a plurality of specified video templates are present in the video templates, obtaining a historical usage amount of each of the specified video templates; and using a specified video template of the specified video templates with the maximum historical usage amount as the first target video template.

5. The method of claim 3, wherein in response to receiving the video editing instruction for the video to be edited, generating and displaying the first target interface further comprises:

displaying the control buttons of the plurality of video templates in the template displaying region in an ascending order of target difference values.

6. The method of claim 1, wherein the preview region includes a first display window and a second display window, the first display window is used to display a first preview video, the second display window is used to display a second preview video, and wherein presenting the first preview video and the second preview video in the preview region comprises:

scaling-down the first display window to a predetermined size, and moving the scaled-down first display window to a first specified region in the preview region;

displaying the first preview video through the scaled-down first display window; and displaying the second preview video within a second display window in a second specified region.

7. The method of claim 6, wherein before scaling-down the first display window to the predetermined size, displaying the first preview video and the second preview video in the preview region further comprises:

obtaining a target number of preview videos displayed in the current preview region; and determining the predetermined size from a predetermined size correspondence according to the target number.

8. The method of claim 6, wherein displaying the second preview video within the second display window in the second specified region comprises:

after adjusting the second display window to the predetermined size, controlling the first preview video and the second preview video to play from a starting frame.

9. The method of claim 1, wherein the method further comprises:

in response to obtaining a replacement action for a third target video template of the video templates and a specified preview video, generating a third preview video corresponding to the third target video template; and replacing the specified preview video with the third preview video, wherein the specified preview video is the first preview video or the second preview video.

10. The method of claim 1, wherein the method further comprises:

in response to obtaining a position adjustment action for a first preview video to be adjusted and a second preview video to be adjusted, adjusting display regions of the first preview video to be adjusted and the second preview video to be adjusted.

11. The method of claim 1, wherein each of the video templates includes a volume adjustment button, and the method further comprises:

obtaining a playing volume input by the volume adjustment button corresponding to each preview video in the preview display region; and playing each preview video according to the playing volume corresponding to the preview video.

12. The method of claim 1, wherein each of the video templates further includes a template usage button, the template usage button is displayed on a preview video image of a corresponding video template of the video templates, and the method further comprises:

in response to receiving a usage instruction triggered by the template usage button on the target preview video, displaying, in the video preview region, only the target preview video; and in response to receiving that an instruction of generating video, storing the target preview video.

13. An electronic device, comprising:

a storage device having a computer program stored thereon;

a processing device configured to execute the computer program in the storage device to implement operations comprising:

in response to receiving a video editing instruction for a video to be edited, generating and displaying a first target interface, the first target interface including a template displaying region and a preview region, the template displaying region including control buttons of a plurality of video templates, and the preview region including a first preview video corresponding to a first target video template in the plurality of video templates;

in response to obtaining triggering by a user for a control button of the control buttons corresponding to a second target video template in the plurality of video templates, generating a second preview video corresponding to the second target video template; and presenting the first preview video and the second preview video in the preview region, wherein the first target interface further includes a playing progress bar of the video to be edited, and the operations further comprise:

establishing a correlation between the first preview video, the second preview video, and the playing progress bar to cause the playing progress bar to simultaneously control playing progress of the first preview video and the second preview video.

14. The device of claim 13, wherein in response to receiving the video editing instruction for the video to be edited, generating and displaying the first target interface comprises:

in response to receiving the video editing instruction, determining a first target video template from the plurality of video templates;

generating the first preview video according to the video to be edited and the first target video template; and displaying the first preview video in the preview region.

15. The device of claim 14, wherein determining the first target video template from the plurality of video templates comprises:

obtaining a first playing duration of the video to be edited and a second playing duration of each of the video templates;

obtaining a target difference value between the first playing duration of the video to be edited and the second playing duration of each of the video templates; and determining the first target video template according to a specified video template of the video templates with a minimum target difference value.

16. The device of claim 15, wherein determining the first target video template according to the specified video template of the video templates with the minimum target difference value comprises:

in response to determining that a plurality of specified video templates are present in the video templates, obtaining a historical usage amount of each of the specified video templates; and using a specified video template of the specified video templates with the maximum historical usage amount as the first target video template.

17. The device of claim 13, wherein the preview region includes a first display window and a second display window, the first display window is used to display a first preview video, the second display window is used to display a second preview video, and wherein presenting the first preview video and the second preview video in the preview region comprises:

scaling-down the first display window to a predetermined size, and moving the scaled-down first display window to a first specified region in the preview region;

displaying the first preview video through the scaled-down first display window; and displaying the second preview video within a second display window in a second specified region.

18. The device of claim 17, wherein in response to receiving the video editing instruction for the video to be edited, generating and displaying the first target interface further comprises:

displaying the control buttons of the plurality of video templates in the template displaying region in an ascending order of target difference values.

19. A non-transitory computer readable medium having a computer program stored thereon, the computer program, when executed by a processing device, implements operations comprising:

in response to receiving a video editing instruction for a video to be edited, generating and displaying a first target interface, the first target interface including a template displaying region and a preview region, the template displaying region including control buttons of a plurality of video templates, and the preview region including a first preview video corresponding to a first target video template in the plurality of video templates;

in response to obtaining triggering by a user for a control button of the control buttons corresponding to a second target video template in the plurality of video templates, generating a second preview video corresponding to the second target video template; and presenting the first preview video and the second preview video in the preview region, wherein the first target interface further includes a playing progress bar of the video to be edited, and the operations further comprise:

establishing a correlation between the first preview video, the second preview video, and the playing progress bar to cause the playing progress bar to simultaneously control playing progress of the first preview video and the second preview video.

20. The non-transitory computer readable medium of claim 19, wherein the operations further comprise:

in response to obtaining a replacement action for a third target video template of the video templates and a specified preview video, generating a third preview video corresponding to the third target video template; and replacing the specified preview video with the third preview video, wherein the specified preview video is the first preview video or the second preview video.

* * * * *